Aug. 4, 1959

W. W. HUBER 2,897,580

INSERT TOOL HOLDER

Filed Sept. 14, 1956

INVENTOR.
William W. Huber
BY Frease & Bishop
ATTORNEYS

Aug. 4, 1959 W. W. HUBER 2,897,580
INSERT TOOL HOLDER
Filed Sept. 14, 1956 3 Sheets-Sheet 2

INVENTOR.
William W. Huber
BY Frease & Bishop
ATTORNEYS

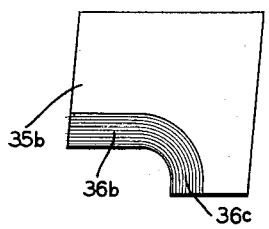
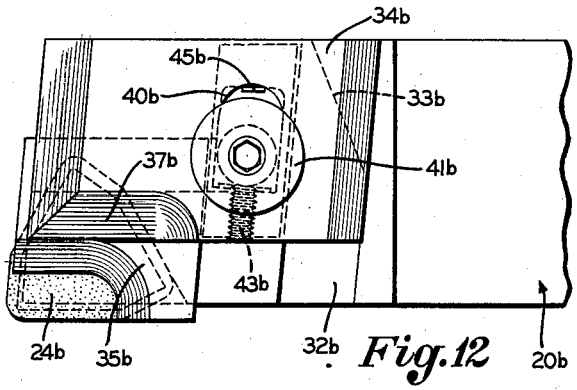
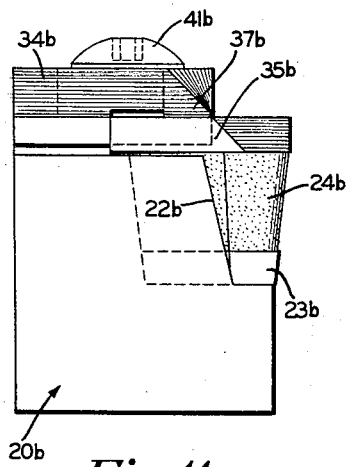
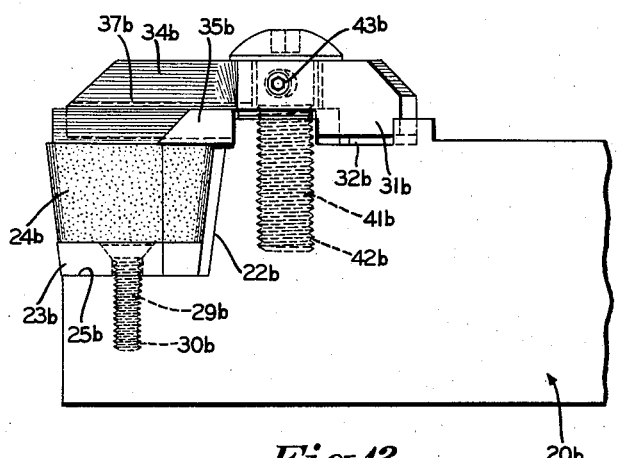
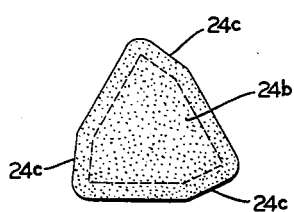
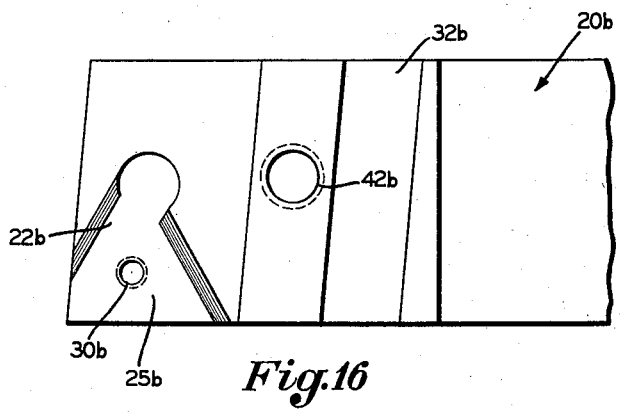
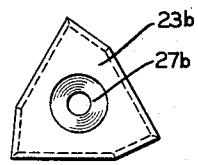

United States Patent Office 2,897,580
Patented Aug. 4, 1959

2,897,580

INSERT TOOL HOLDER

William W. Huber, Canton, Ohio, assignor to United States Ceramic Tile Company, Canton, Ohio, a corporation of Delaware Application September 14, 1956, Serial No. 609,967

3 Claims. (Cl. 29—96)

The invention relates to insert tool holders and more especially to holders for throw-away inserts of the lozenge or button type.

Such throw-away inserts are coming into general use for machine turning and cutting tools, and are usually in the form of hardened lozenges or buttons of square, triangular or other shape, formed of carbides, oxides or the like.

Tool holders have been provided for such inserts but such tool holders as are now in use are not entirely satisfactory as they do not combine minimum width of the tool holder and clamping means for bearing evenly over the full length of the chip breaker, tool insert and shim assembly.

It is an object of the present invention to generally improve tool holders of the character referred to.

A primary object of the invention is the provision of a tool holder having a separable adjustable chip breaker which is not an integral part of the clamp or other portion of the tool holder.

It is also an object to provide such a tool holder having no projections thereon to obstruct free flow of the chips, or around which the chips may wind.

A further object is to provide a relief or clearance at the top edge of the pocket so that the top edge of the tool insert does not contact the sides of the pocket.

Another object is to provide such a tool holder which may be held to a minimum width.

A further object is to provide a tool holder of the character referred to which has a replaceable and indexing shim seat on the tool anvil secured to the tool holder with a removable screw.

A still further object is to provide such a tool holder having a chip breaker designed to protect the edges of the tool insert which are exposed to chip damage.

Another object of the invention is to provide a tool holder of this character having a key lock clamp designed to prevent shifting on heavy cuts and to insure parallel movement with the tool insert and chip breaker in making adjustments.

It is also an object of the invention to provide a tool holder of this type having a chip breaker adjustment screw on the front side of the clamp to prevent movement of the clamp during cutting and to assure constant setting of the chip breaker when indexing the tool insert.

Another object is to provide a tool holder of the character referred to in which the clamp has a heel designed to cause the edge of the clamp to automatically adjust itself and to bear evenly over the full length of the chip breaker, tool insert and shim insert, to provide secure and automatic parallel clamping to variations in combined thickness of the various clamped parts.

A further object is to provide such a tool holder in which the clamp has an undercut parallel to the clamping edge which places the clamping pressure near the center of the tool insert.

A still further object is to provide a tool holder of this character in which the clamp includes a leaf spring mounted therebeneath for lifting the clamp and freeing the removable clamped parts when making adjustments.

Another object is to provide such a tool holder in which the several parts thereof, including the clamp and the spring skirt, are designed to prevent chips, scale and debris from accumulating under the clamp and around the interchangeable parts.

A further object of the invention is to provide means upon the leaf spring for locking the chip breaker adjustment screw.

The above objects together with others which will be apparent from the drawings and following description, or which may be later referred to, may be attained by constructing the improved insert tool holder in the manner hereinafter described in detail and illustrated in the accompanying drawings, in which;

Fig. 12 is a fragmentary top plan view of a tool holder designed for a triangular insert tool, showing a right-hand tool holder with zero degree lead angle and neutral back and side rake;

Fig. 13 is a side elevation of the tool holder shown in Fig. 12;

Fig. 14 is an end view of the tool holder shown in Fig. 12;

Fig. 15 is a detached plan view of the chip breaker used in the tool holder shown in Figs. 12 to 14;

Fig. 16 is a fragmentary top plan view of the tool holder with the indexing shim seat, insert tool, chip breaker and clamp removed therefrom;

Fig. 17 is a detached plan view of the triangular tool insert used in the tool holder shown in Figs. 12 to 16; and, Fig. 18 is a detached plan view of the indexing shim seat used with the tool holder.

Referring now more particularly to the embodiment of the invention illustrated in Figs. 1 to 5, a tool holder is shown designed for a square insert tool. These tool holders are made in both right and left-hand and may be adapted for facing tools, turning tools and shoulder tools.

The tool holder is adapted to hold the insert tool at a negative back rake as in Figs. 1 to 5, or may be constructed to hold the insert tool at a neutral back and side rake, or to hold the insert tool at a positive back and side rake. The tool may have a 15 degree lead angle, as in Figs. 1 to 5, or any other desired lead angle, or may have a zero degree lead angle.

The tool holder shown in Figs. 1 to 5 is formed from a steel bar of substantially rectangular cross section, as indicated generally at 20, or of other suitable shape and size to be clamped in the tool post of a lathe or the like.

The inner side of the tool holder may be cut away at the end at a 15 degree angle, as indicated at 21, to provide a 15 degree lead angle. This end portion of the tool holder is cut out as at 22 to provide a pocket for receiving the indexing shim seat or tool anvil 23 and the tool 24.

Figure 2:
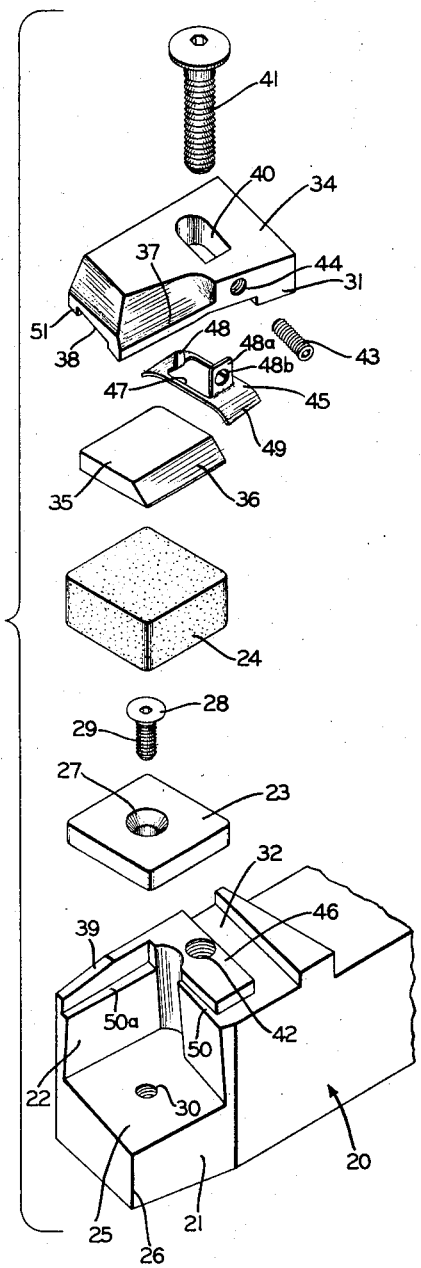
Fig. 2 is an exploded view of the tool holder shown in Fig. 1.

This pocket is located at an angle as best shown in Fig. 2, the bottom wall or tool anvil 25 thereof being inclined downwardly toward the outer corner 26 so as to provide for locating the tool 24 at a negative angle. The upper ends of the side walls of the pocket are relieved as indicated at 50 and 50a, to prevent the upper edges of the tool insert from being damaged by contact with said side walls.

The rearward relief 50 is used as a guide for the chip breaker, and the relief 50a may be used as a back stop for the chip breaker when it is not used as adjustable.

The shim seat 23 has a central countersunk opening 27 therein to receive the countersunk head 28 of the screw 29 which engages the threaded bore 30 in the tool holder for fastening the shim seat 23 tightly in place upon the bottom wall or anvil 25 of the tool holder.

Figure 3:
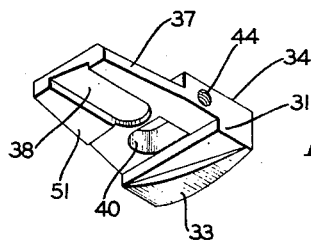
Fig. 3 is a perspective view of the underside of the clamp shown in Figs. 1 and 2.

A transversely disposed groove 32 is formed in the top of the tool holder 20 at a point spaced rearwardly from the pocket 22. This groove is provided to receive the key 31 and the heel 33 of the clamp 34. As shown in Fig. 3, the heel 33 of the clamp is of substantially elongated triangular shape and convex on its underside so as to permit the clamp to rock so that the edge 37 thereof will adjust itself to bear evenly over the full length of the chip breaker indicated at 35.

This chip breaker is of rectangular shape with the bevelled edge 36 adapted to be located over substantially the full area of the insert tool. The forward end portion of the clamp 34 has the bevelled edge portion 37 adapted to bear upon the full length of the chip breaker adjacent to the bevelled edge 36 thereof.

The underside of the clamping edge is inclined upwardly and rearwardly at a slight angle so as to allow the front edge of the clamp to contact the chip breaker in all adjusted positions of the clamp due to variation in height of the component parts.

The clamp is undercut as at 38, parallel to the clamping edge 37 thereof so as to place the clamping pressure forward of the center of the insert tool 24. The back edge 51 of the clamp, beyond the undercut 38, is extended downward forming a back stop for the chip breaker 35, as shown quite clearly in Fig. 4, when the chip breaker is used as adjustable.

As the chip breaker is stopped by the extended back edge portion 51 of the clamp, by adjusting the screw 43 the clamp is made to move forward or backward causing a differential in the chip breaker with relation to the cutting edge of the tool.

Since the pressure applied to the chip breaker by the chip will force it back until it comes to rest against the stop portion 51, it might be said that to locate the chip breaker, pressure must be applied causing it to rest against the stop 51 before the clamping screw 41 is tightened.

The top edge of the back wall of the pocket 22 is bevelled as at 39 to provide a clearance for the back edge of the clamp. A transversely disposed elongated opening 40 is provided in the clamp to receive the clamping bolt 41 which is screwed into the internally threaded bore 42 of the tool holder 20.

For the purpose of preventing movement of the clamp during cutting and also assure constant setting of the chip breaker when indexing the tool insert, an adjustment screw 43 is screwed into the horizontal threaded bore 44 in the clamp and into contact with the shank of the clamping screw 41.

A leaf spring 45 is located around the clamping screw 41 and interposed between the clamp and the flat top portion 46 of the tool holder. This spring is provided with the elongated opening 47 to receive the clamping bolt 41 and with the upturned lugs 48 and 48a at opposite ends of the opening 47 received within the ends of the elongated opening 40 of the clamp. The lug 48 has an aperture 48b therein to receive the adjustment screw 43.

The downwardly curved skirt 49 of the spring serves to prevent chips, scale and other debris from accumulating under the clamp. When the spring is compressed by clamping action the adjustment screw 43 will be locked in the opening 48b of the lug 48a of the spring.

It will be seen that when the clamping screw 41 is tightened the clamping edge 37 of the clamp will, because of the particular shape of the heel 33, be caused to adjust itself to bear evenly over the full length of the chip breaker 35, tool insert 24 and shim 23.

Figure 1:
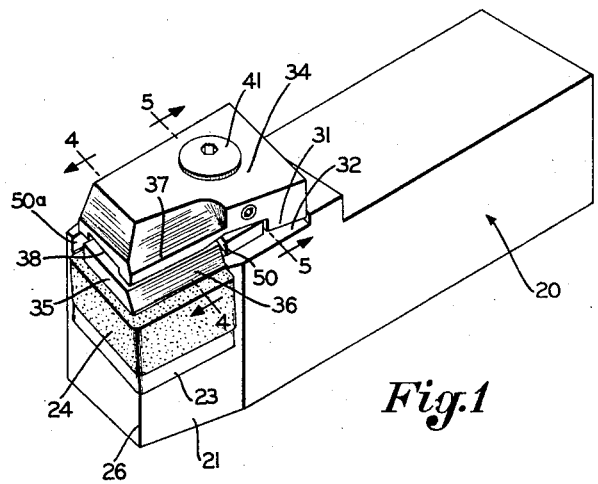
Fig. 1 is a perspective view of a tool holder embodying the invention, designed for a square insert tool, the tool holder shown being a right-hand tool holder with 15 degree lead angle and negative back and side rake.

This construction provides secure and automatic parallel clamping to variations in combined thickness of the several clamped parts. It will also be evident that when the insert tool is clamped in place as shown in Fig. 1, the parts are enclosed so as to prevent chips, scale and other debris from accumulating under the clamp or other parts of the device.

Figure 5:
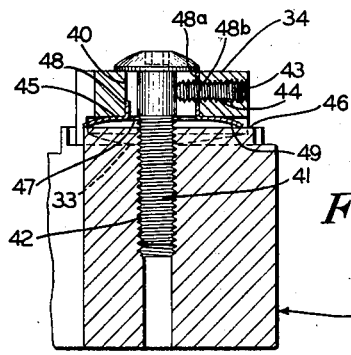
Fig. 5 is a transverse section taken as on the line 5—5, Fig. 1.
Figure 4:
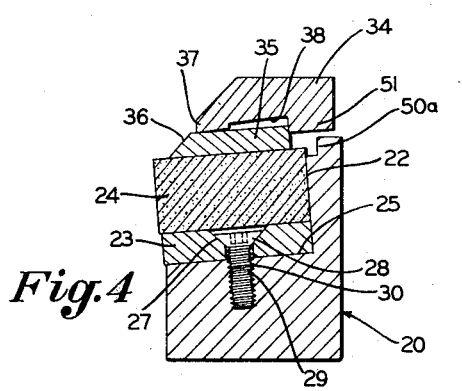
Fig. 4 is a transverse section taken as on the line 4—4, Fig. 1.
Figure 6:
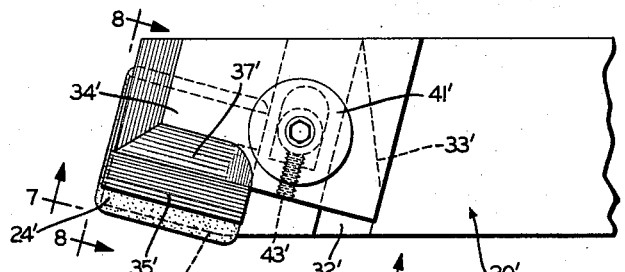
Fig. 6 is a fragmentary top plan view of a tool holder designed for a square insert tool, showing a right-hand tool holder with 15 degree lead angle and neutral back and side rake.
Figure 8:
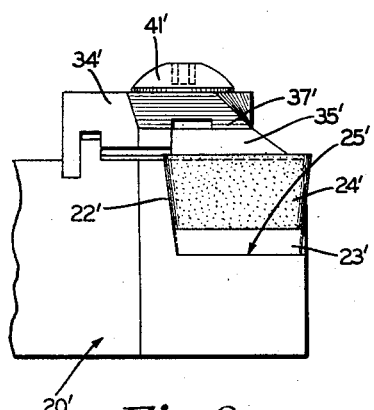
Fig. 8 is an end elevation of the tool holder shown in Fig. 6, viewed as on the line 8—8, Fig. 6.
Figure 7:
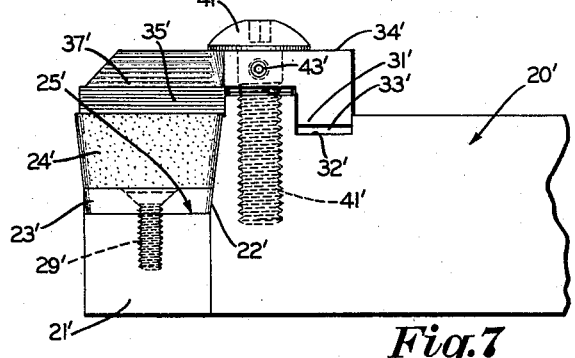
Fig. 7 is a side elevation of the tool holder shown in Fig. 6, viewed as on the line 7—7, Fig. 6.

In Figs. 6, 7 and 8 is shown a right-hand 15 degree lead angle, neutral side and back rake, tool holder for square insert tool. The tool holder indicated generally at 20' is substantially the same as shown in Figs. 1 to 5, and is cut away on a 15 degree angle as indicated at 21'.

The pocket 22' formed in the end of the tool holder, to receive the insert tool 24' and indexing shim seat 23', has the horizontal bottom wall or anvil 25' so as to locate the tool at a neutral side and back rake.

The clamp 34' is of substantially the same construction as the clamp above described and is provided with the triangular convex heel portion 33' upon the key 31', located in the transverse groove 32' in the top of the tool holder.

The clamp is clamped in place by the clamping screw 41' so that the clamping edge 37' thereof engages along the full length of the chip breaker 35', all in the manner above described.

The adjustment screw 43' is provided for contact with the clamping screw 41' in the manner above described, and a spring such as shown in Figs. 2 and 5 is provided beneath the clamp. The indexing shim seat 23' is secured with the removable screw 29'.

Figure 9:
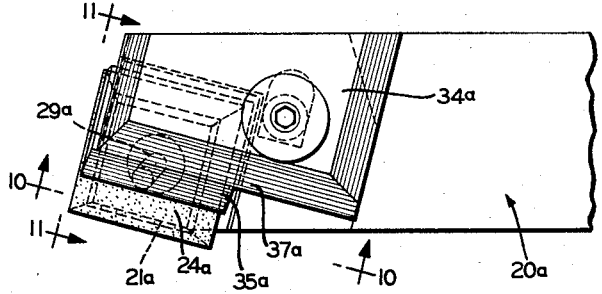
Fig. 9 is a fragmentary top plan view of a tool holder for a square insert tool showing a right-hand tool holder with 15 degree lead angle and positive back and side rake.
Figure 11:
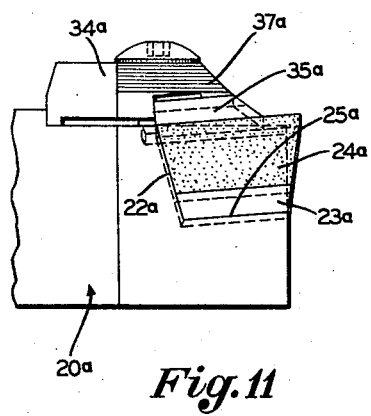
Fig. 11 is an end elevation of the tool holder shown in Fig. 9, viewed as on the line 11—11, Fig. 9.
Figure 10:
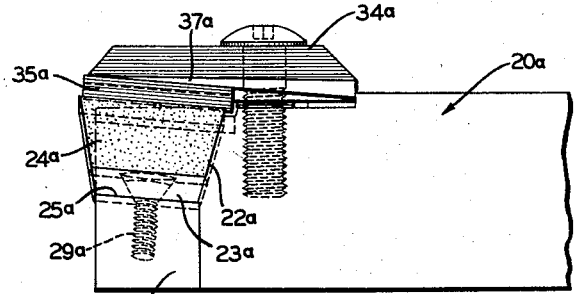
Fig. 10 is a side elevation of the tool holder shown in Fig. 9, viewed as on the line 10—10, Fig. 9.

In Figs. 9, 10 and 11 is shown a right-hand tool holder with 15 degree lead angle for square insert tool, at a positive side and back rake angle. The tool holder is indicated generally at 20a and is cut away at its forward end on a 15 degree angle, as indicated at 21a, to provide a 15 degree lead angle.

The pocket 22a, to receive the shim seat 23a and insert tool 24a, is tilted inwardly so that the bottom wall or anvil 25a thereof is inclined inwardly. The indexing shim seat is secured by means of the removable screw 29a.

The clamp 34a is substantially the same as the clamp above described, with the exception that the clamping edge 37a is inclined forward and upward so as to bear evenly along the full length of the chip breaker 35a. All other parts are the same as illustrated and described in detail with reference to Figs. 1 to 5.

It will be understood that the above tool holders may be made left hand by simply reversing the arrangement and location of the parts and it is therefore not thought necessary to illustrate and describe the same in detail.

It will also be obvious that if a zero degree lead is desired, or any other lead angle instead of the 15 degree lead shown in the above described figures, the end of the bar 20a will not be cut away at an angle as indicated at 21a and the insert tool and all parts will be located parallel with the tool holder instead of at an angle thereto.

In Figs. 12 to 18 is shown a modification of the tool holder adapted for a triangular insert tool such as indicated generally at 24b. The tool holder shown is a right-hand zero degree lead angle, neutral side and back rake tool holder and it should be understood that this tool holder, like the square tool holders shown in Figs. 1 to 11, may also be made in left hand and 15 degree or any other lead angle and in positive and negative side and back rakes.

The bar 20b from which the tool holder is formed may be substantially the same as those above illustrated and described in detail and is provided at its forward inner corner with the V-shape pocket 22b to receive the indexing shim seat 23b and the insert tool 24b.

This insert tool is of triangular shape with the vertexes cut off to form an 85 degree angle with the side of the triangle, as shown at 24c. This is done to give greater strength to the tool against side cutting pressure.

As shown in Fig. 18, it will be seen that the indexing shim seat 23b is of triangular shape, conforming to the shape of the insert tool 24b. The shim seat is provided with central countersunk opening 27b which receives the removable screw 29b for attaching the shim seat to the horizontal flat bottom wall 25b of the pocket 22b, the screw 29b being screwed into the threaded bore 30b.

The chip breaker 35b instead of being substantially rectangular with a straight bevelled edge for clamping adjacent to the opposed cutting edge of the tool, has the bevelled edge 36b curved outwardly at the rear end as at 36c extending out to the edge of the insert tool. This protects the unused cutting edge of the tool insert. Otherwise this tool holder is substantially the same as described and illustrated above.

The clamp 34b has the heel portion 33b upon the key 31b located in the transverse groove 32b of the tool holder and is adapted to be clamped upon the chip breaker insert tool and shim seat assembly by the clamping screw 41b screwed into the threaded bore 42b of the tool holder.

The clamp is provided with elongated opening 40b to receive the clamping screw, and spring 45b is associated therewith in the manner above described. Adjustment screw 43b is provided for adjusting the position of the clamp relative to the screw in the manner above described.

The clamping edge 37b of the clamp extends straight forwardly in the illustrated form as this is a zero degree lead angle tool. The several forms of the invention illustrated are given as illustrations and it is believed that it will be obvious to those skilled in the art that either the square, triangular or other shape tool holder may be made in either right hand or left hand and with zero or any desired degree lead angle and with neutral, negative or positive side and back rake, without departing from the invention.

It will be obvious from the above that the tool holder may be made of minimum width, that the chip breaker is adjustable and is designed to protect the edges of the tool insert exposed to chip damage; that the key lock clamp is designed to prevent shifting on heavy cuts and to assure parallel movement with the tool insert and chip breaker in making adjustments.

It will also be evident that the chip breaker adjustment screw on the front side of the clamp prevents movement of the clamp during cutting and also assures constant setting of the chip breaker when indexing the tool insert; and that the clamp is so designed that the heel thereof located in the transverse groove of the tool holder, will cause the clamping edge to adjust itself to bear evenly over the full length of the chip breaker, tool insert and shim assembly so as to provide secure and automatic parallel clamping for variations in combined thickness of the various clamped parts.

It will also be seen that the undercut in the clamp, parallel to the clamping edge, places the clamping pressure forward of the center of the tool insert.

Further it will be evident that the spring mounted beneath and associated with the clamp lifts the clamp when making adjustments, freeing removable clamp parts, and the special spring skirt serves to prevent chips, scale and other debris from accumulating under the clamp. The spring also secures the adjustment screw.

Further it is evident that the tool holder and clamp and associated parts are so designed as to prevent chips, scale and other debris from accumulating around the interchangeable parts.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. A tool holder for an indexible insert cutting tool, said tool holder comprising a metal bar having a forward end and a rear end, there being a pocket in the forward end of the bar shaped to conform to the insert tool, said pocket being open through the end and one side and the top of the bar, a shim seat upon the bottom wall of the pocket, the insert tool being located upon the shim seat and having a cutting edge adjacent said one side of the bar, a chip breaker upon the top of the insert tool, a clamping screw attaching the clamp to said metal bar at a point between the chip breaker and the rear end of the bar, a heel portion upon the clamp having a single line contact with the bar at a point between said clamping screw and the rear end of the bar, there being an elongated transverse opening in the clamp through which the clamping screw is located, an adjustment screw located transversely through the front of the clamp and contacting the clamping screw, and a leaf spring surrounding the clamping screw between the clamp and the bar, said leaf spring having a downwardly curved skirt and upwardly disposed ears located in said elongated opening, one of said ears having an aperture through which the adjustment screw is located.

2. A tool holder as specified in claim 1, in which said triangular heel portion of the clamp is convex on its underside transversely of the clamp.

3. A tool holder for an indexible insert cutting tool, said tool holder comprising a metal bar having a forward end and a rear end, there being a pocket in the forward end of the bar shaped to conform to the insert tool, said pocket being open through the end and one side and the top of the bar, the insert tool being located in said pocket and having a cutting edge adjacent said one side of the bar, a clamp having a clamping edge coextensive with the length of the cutting edge of the insert tool, a clamping screw attaching the clamp to the metal bar, there being an elongated transverse opening in the clamp through which the clamping screw is located, an adjustment screw located transversely through the front of the clamp and contacting the clamping screw, and a leaf spring surrounding the clamping screw between the clamp and the bar, said leaf spring having a downwardly curved skirt and upwardly disposed ears located in said elongated opening, one of said ears having an aperture through which the adjustment screw is located.

References Cited in the file of this patent

UNITED STATES PATENTS

| | | |
|---|---|---|
| 2,181,023 | Moore | Nov. 21, 1939 |
| 2,675,604 | Plummer | Apr. 20, 1954 |
| 2,697,272 | Clark | Dec. 21, 1954 |
| 2,716,800 | Bader | Sept. 6, 1955 |
| 2,734,256 | Forward | Feb. 14, 1956 |
| 2,799,079 | Brigner | July 16, 1957 |

FOREIGN PATENTS

| | | |
|---|---|---|
| 275,215 | Great Britain | Jan. 19, 1928 |
| 453,173 | Great Britain | Sept. 7, 1936 |
| 465,537 | Great Britain | May 10, 1937 |
| 989,307 | France | May 23, 1951 |
| 1,041,370 | France | May 27, 1953 |
| 1,073,900 | France | Mar. 24, 1954 |